United States Patent [19]

Rimkunas et al.

[11] Patent Number: 5,407,321
[45] Date of Patent: Apr. 18, 1995

[54] DAMPING MEANS FOR HOLLOW STATOR VANE AIRFOILS

[75] Inventors: Donald A. Rimkunas, Palm Beach Gardens, Fla.; David A. Lewis, Andrews, N.C.

[73] Assignee: United Technologies Corporation, Hartford, Conn.

[21] Appl. No.: 159,416

[22] Filed: Nov. 29, 1993

[51] Int. Cl.⁶ .................................................. F01D 5/10
[52] U.S. Cl. ................................. 415/119; 415/115; 416/500
[58] Field of Search ..................... 415/115, 116, 119; 416/140, 229 A, 233, 500

[56] References Cited

U.S. PATENT DOCUMENTS

| | | | |
|---|---|---|---|
| 2,689,107 | 9/1954 | Odegaard | 416/500 |
| 3,369,792 | 2/1968 | Kraimer et al. | 415/115 |
| 4,025,226 | 5/1977 | Hovan | 415/115 |
| 4,207,027 | 6/1980 | Barry et al. | 415/115 |
| 4,437,810 | 3/1984 | Pearce | 415/115 |

*Primary Examiner*—John T. Kwon
*Attorney, Agent, or Firm*—Norman Friedland

[57] ABSTRACT

Damping for the airfoils of stator vanes is provided by a spring damper formed from an elongated spring element bent into a "U" or "V" shape in cross section and oriented in the hollow of the airfoil so that the legs of the "U" or "V" frictionally engage the inner surfaces of the opposing pressure side and suction side walls of the airfoil to dissipate the vibratory energy. The elongated spring element is inserted through a hole formed on one end of the airfoil to extend just short of one of the ends of the airfoil to form a cantilevered mounted spring. The edge of the legs may be scalloped to allow the passage of air from one inner surface to the other of the airfoil.

8 Claims, 4 Drawing Sheets

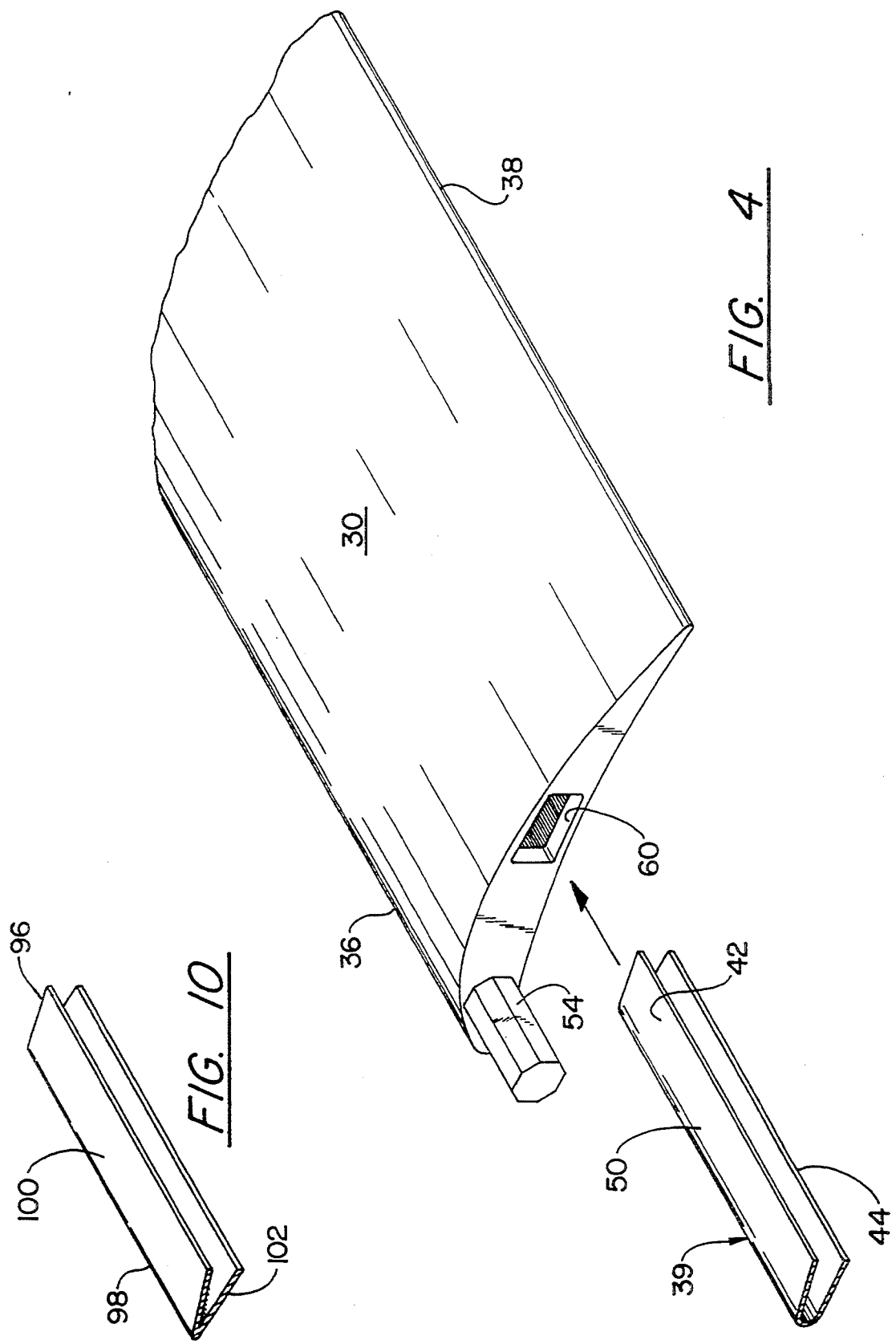

DAMPING MEANS FOR HOLLOW STATOR VANE AIRFOILS

TECHNICAL FIELD

This invention relates to stator vanes and particularly to means for damping the hollow airfoils.

BACKGROUND ART

As is well known in aircraft and gas turbine engine technology, the constant flights of the aircraft subject the aircraft components and particularly the components of the engine to severe vibrations. One of the problems encountered with the hollow airfoils of the stator vanes of the gas turbine engine is the propensity for premature cracking of the walls of the airfoil. Experience has shown that subjecting these vanes to severe vibrations after time the initiation of the crack will generally occur at the leading edge of the airfoil on its smooth side where there are no air cooling holes. The cracking typically initiates at the high stress field determined by the local stress concentration factor and the high bending stress. One approach that has been tried for solving this cracking problem is to "soften" the local "hard" point between the thin vane surface and the stiff leading and trailing edges. This technique has not proven to be satisfactory.

Another technique and one that is more pertinent to the present invention is disclosed in U.S. Pat. No. 2,689,107 which is commonly assigned to the assignee of this patent application. This patent discloses a frictional damper that utilizes a sinusoidal shaped spring member extending longitudinally in the cavity of a hollow vane or blade that extends from the tip to the root of the blade. The tip cap is removed and rewelded into place to accommodate insertion and removal of the spring. The lands of the spring bear against the opposite surfaces of the pressure and suction walls where the frictional contact effectuates the damping and absorbs the energy generated by the vibratory motion. This design requires that the end cap which is located at the thinnest section of the blade to be removed so as to insert the spring in the blade and that the spring extend the expanse from the leading to trailing edges in the cavity. This is true whether the design utilizes a single spring or multiple springs configurations. While this damper has proven to be efficacious, it is limited to being incorporated in the original design and fabricated at the initial fabrication or production of the blade. Further, the prior art configuration requires that the blade be of the type that includes an end or tip cap. Unlike the present invention, the prior art design isn't applicable for blades that are existing and are in service where field repair is necessary. Hence, the structure disclosed in the U.S. Pat. No. 2,689,107, does not lend itself to be fabricated as a retrofit item as is the case of the present invention.

This invention contemplates utilizing a judiciously designed spring damper inserted in the hollow airfoil along the longitudinal direction so that the elements of the spring bear against the inside surface of the pressure side and suction side to absorb the energy generated by these vibrations. The damper consists of a single elongated member bent along its longitudinal axis forming a U-shaped or V-shaped spring in cross section. The outer surfaces of the arms of the U-shaped or V-shaped spring bear against the inner surfaces of the opposing airfoil walls and by virtue of the frictional action between the spring and the wall the vibratory energy is dissipated. The invention as described hereinbelow is adapted for installation in existing stator vanes and lends itself to being fabricated as a retrofit sub-assembly.

The spring damper of this invention in one embodiment is easily installed through a small hole formed on the one end of the airfoil and held in position by a rivet or suitable bond. The spring damper of this embodiment is particularly suited for use in retrofitting existing airfoils. In another embodiment the spring damper carries a tang formed at one end of the spring damper that fits into a hole formed at one end of the airfoil and is riveted or suitably bonded thereto. The inner surface of the opposing walls (suction side and pressure side) include a projection extending into the hollow of the airfoil for defining a stop that serves to guide and locate the damper as it is being installed and once it assumes its proper position.

In either instance the spring damper is securely held at one end while the other end is free to move as in a cantilever mount. In addition to being relatively easy to manufacture and install and capable of installation in existing airfoils, (although it can also be utilized in original designed hardware) this invention does not require separate end caps as is the case of the heretofore known designs. In addition, and not by way of limitation, this invention will function in airfoil designs which contain a large amount of taper, twist, and a nonuniform cavity. As it is easy to install, it is likewise easy to remove which is very important in aircraft applications where continuous and repetitive inspections of the damper and airfoil are required and is lighter and less expensive than heretofore known designs.

SUMMARY OF THE INVENTION

An object of this invention is to provide improved frictional damping for a hollow stator airfoil for a gas turbine engine that is adaptable as being available in the form of a retrofit sub-assembly.

A feature of this invention is to provide as a frictional damper an elongated spring-like element that is shaped in cross section in a "V" or "U" shaped element with the legs of the "V" or "U" shaped element adapted to bear against the inner surface of the pressure and suction walls of an airfoil.

A still further feature of this invention is the provision of means for assuring the passage of coolant in the internal portion of the airfoil.

A still further feature is an improved frictional damper for hollow airfoils that is characterized as being lighter and more economical than heretofore known dampers, that is easy to install and remove, is efficacious in airfoils in general and airfoil designs which contain a large amount of taper, twist and nonuniform cavity and is adaptable to be used for existing airfoils.

The foregoing and other features of the present invention will become more apparent from the following description and accompanying drawings.

BRIEF DESCRIPTION OF DRAWINGS

FIG. 4 is an exploded view in perspective showing the details of the invention;

FIG. 10 is an end view of another embodiment of the invention where the spring damper is "V" shaped.

BEST MODE FOR CARRYING OUT THE INVENTION

Figure 1:
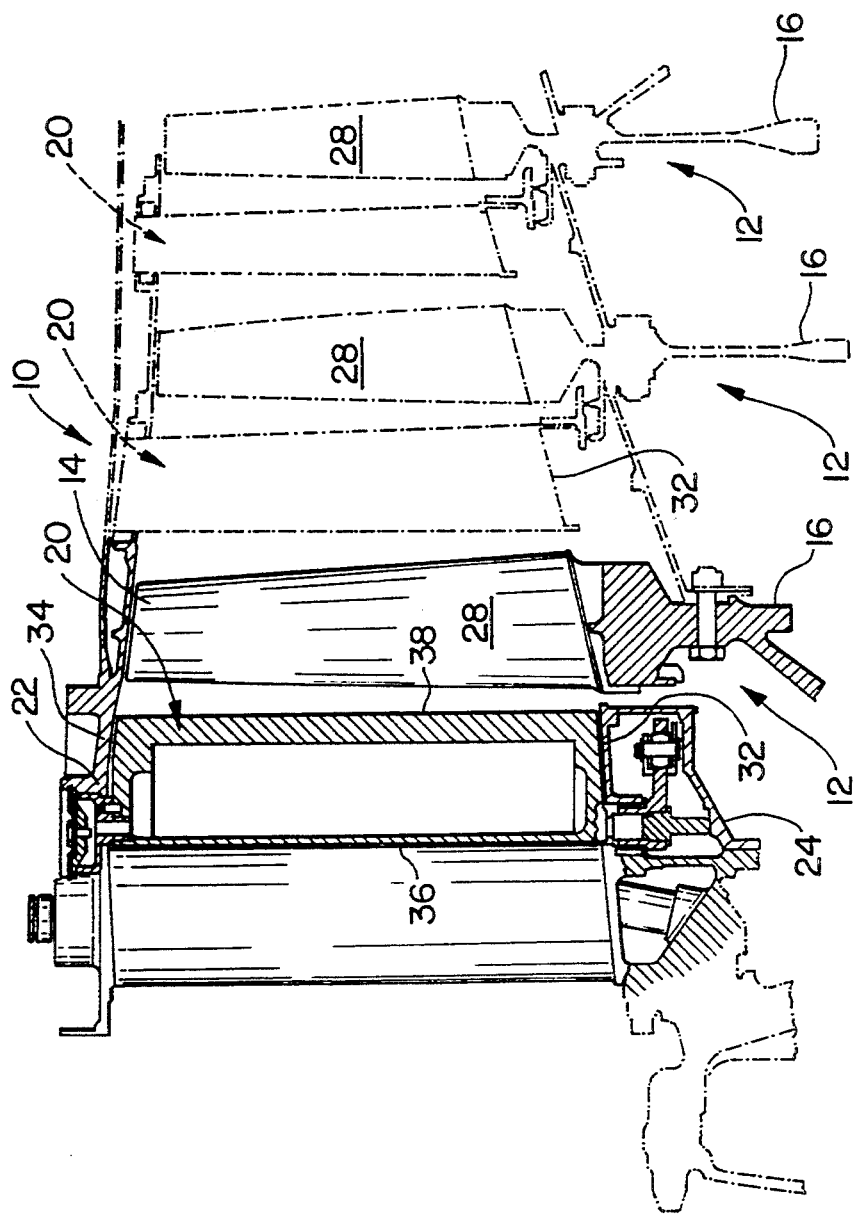
FIG. 1 is a fragmentary view partly in elevation, partly in section and partly in phantom illustrating the prior art compressor section without the invention.

While this invention is described in its preferred embodiment as being employed in the stator of the compressor in a gas turbine engine, it will be appreciated by those skilled in this art, that the invention may be utilized in other airfoils and in other environments. However, it is necessary, in the context of this invention, that the airfoil be hollow and that it is subjected to vibratory levels that require damping.

To understand this invention, reference is made to the prior art illustrating a partial view of the compressor section, generally indicated by reference numeral 10, of a gas turbine engine which includes a plurality of axially spaced compressor rotors 12 defining stages of compressor consisting of rows of a plurality of circumferentially spaced axial flow compressor blades 14 suitably attached to or formed integral with rotor disks 16. The disks 16 are connected to the engine shaft 18 to be rotatably supported thereby to impart rotary motion to the blades 12. Disposed ahead of each of the rotors 12 are a plurality of compressor stators 20 suitably supported to the compressor outer housing 22 and inner housing 24. Each stator consists of a plurality of circumferentially spaced vanes defining an annular flow path for the engine's working fluid medium (gas path). The vane is comprised of an outer wall 28 defining a pressure side, an inner wall 30 defining a suction side, a root section, a tip section 34, a leading edge 36 and a trailing edge 38 together defining an airfoil for providing an aerodynamically clean and efficient surface for guiding the gas path into the compressor blades. The airfoil may be cast or formed into two halves separated along the longitudinal plane and bonded to form a hollow airfoil. The description immediately above describes well known compressor rotors and stators of gas turbine engines used to power aircraft. Engines that utilize compressor sections as described are manufactured by United Technologies Corporation, the assignee common to this patent application and can be found in engine models such as the JT-9D, JT-8D, PW-4000, PW-2000, J-52, F-100 and others.

Figure 2:
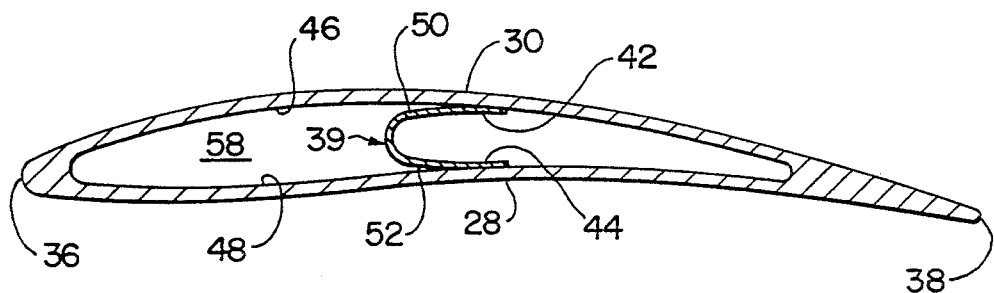
FIG. 2 is a sectional view of a stator vane incorporating the invention.
Figure 3:
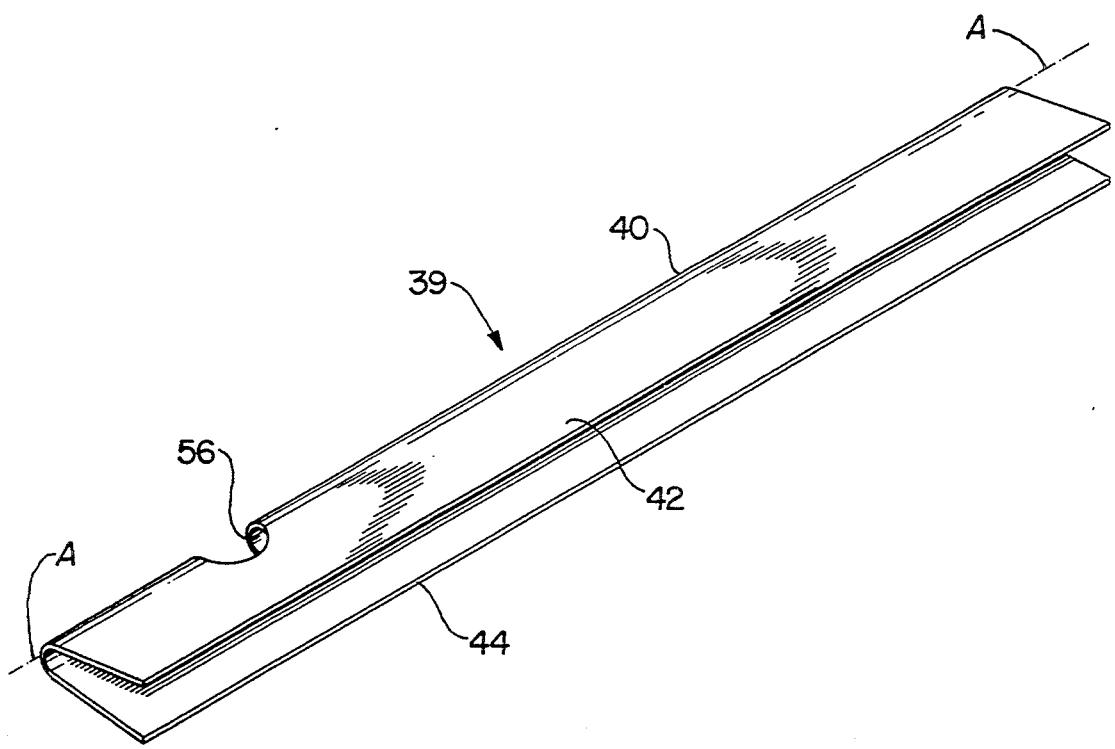
FIG. 3 is a perspective view of the damper.
Figure 7:
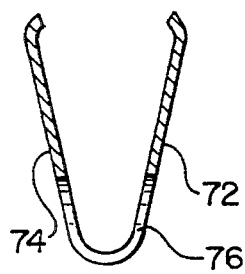
FIG. 7 is an enlarged view partly in section taken along lines 7—7 of FIG. 6.
Figure 6:
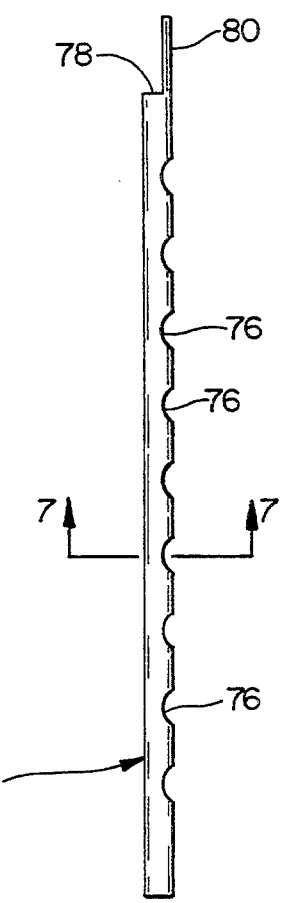
FIG. 6 is a side view of the spring damper depicted in FIG. 5.
Figure 8:
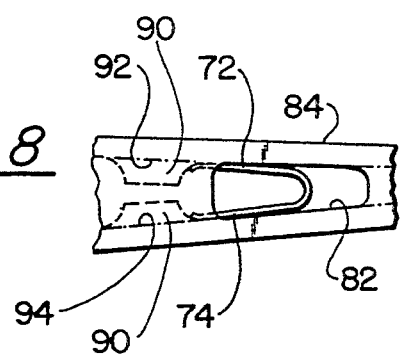
FIG. 8 is a bottom end enlarged partial view of the airfoil taken along lines 8—8 of FIG. 8.
Figure 9:
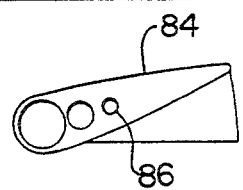
FIG. 9 is a top end view of the airfoil depicted in FIG. 6.
Figure 5:
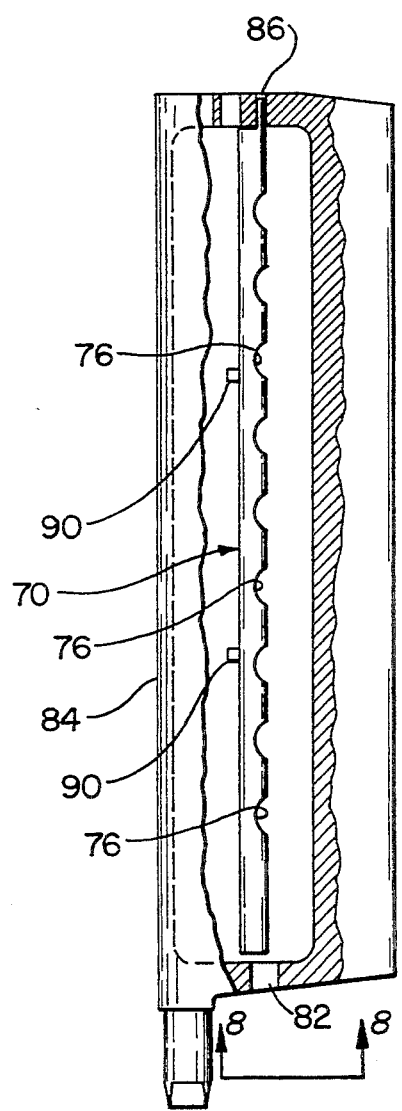
FIG. 5 exemplifies another embodiment and is a partly cut away view in elevation illustrating the invention when utilized in original airfoils.

As is well known, because of the extreme vibratory environment to which compressor sections are subjected vibration damping is often required. According to this invention as best seen in FIGS. 2-4, which is particularly efficacious for providing damping in existing airfoils such as the ones described immediately above, the spring damper generally illustrated by reference numeral 39 is comprised of a single sheet-like elongated element 40 formed from spring material that is flexible and resilient and bent along the longitudinal axis A to define a U-shaped element in cross section having opposing arms 42 and 44. As will be noted in FIG. 2 the outer surfaces 50 and 52 of arms 42 and 44, respectively bear against the inner wall surfaces 46 and 48, of the suction side 30 and pressure side 28, respectively. As mentioned above, the coaction of the frictional engagement of these surfaces serve to dissipate the vibratory energy exerted on the vane.

To install the spring damper in an existing hollow airfoil, a hole is cut or broached at one end of the airfoil as shown in FIG. 4 and the spring damper 39 is inserted through the opening. Once installed, the opening may be closed off by bonding say, by braising a piece of suitable material to fill the void. The length of element 40 is dimensioned so that it is shorter than the length of the airfoil, that is short of the opposing end and hence, leaving the spring damper to be cantilevered mounted i.e. one end of element 40 is bonded, say by braising, at the end adjacent the opening of the airfoil to allow the frictional engagement of the outer surfaces 50 and 52 relative to the inner wall surfaces. In the embodiment depicted in FIGS. 1-4, the airfoil is rotatable and hence carries a stem 54 fixed to and extending from the root of the airfoil.

Arcuate slot 56 is cut into the apex end of element 40 to allow the passage of coolant that is admitted into the airfoil's cavity 58. Typically, and not a part of this invention, the airfoils are cooled by allowing compressor air to flow into cavity 58 through an opening formed at the end of the airfoil and discharging through apertures formed in the wall either on the suction or pressure side or both of the airfoil (not shown).

As mentioned earlier, the above described embodiment of this invention is particularly efficacious for retrofitting existing airfoils. The embodiment depicted in FIGS. 5-8 illustrate this invention when incorporated into original hardware, i.e. at the inception of the airfoil. As noted from viewing FIG. 8 the spring damper generally illustrated by reference numeral 70 is an elongated member identical to the one depicted in FIG. 3 save for the fact that the apex of legs 72 and 74 is scalloped as to form recesses 76 to permit the passage of coolant in the airfoil and the top end 78 carries an axially extending narrow projection 80. When installed, the narrow projection 80 which extends in the longitudinal direction is inserted in the opening 82 formed on the bottom of the airfoil 84 (FIGS. 5 and 8) with the projection 80 fitting into a drilled hole 86 formed in the top wall 88 of airfoil 84 and may be bonded thereto by any suitable means such as braising or being riveted. Stops 90 are cast integrally with the airfoil and extend from one surface of the inner wall of the airfoil to form guides and stops for the spring damper 70. The spring damper 70 serves the identical purpose as the spring damper 39 described in connection with the other embodiment. The outer surfaces of legs 72 and 74 adjacent the open end frictionally engage the inner walls 92 and 94 of the airfoil 84 such that the energy generated by the vibratory motion will be dissipated thereby.

FIG. 10 exemplifies another embodiment of this invention where the spring dampers 39 (FIG. 2) and 70 (FIG. 6) are modified so that the elongated member 96 is bent at the apex 98 to be configured in a generally "V" shaped member. The arms 100 and 102 of the "V" shaped member are extended to engage the inner walls of the hollow vane similarly to the other embodiments.

Although this invention has been shown and described with respect to detailed embodiments thereof, it will be appreciated and understood by those skilled in the art that various changes in form and detail thereof may be made without departing from the spirit and scope of the claimed invention.

We claim:

1. A hollow airfoil for the stator of the compressor of a gas turbine engine including wall means defining a pressure side, a suction side a tip and a root, in combination with a spring damper means comprising an elongated U-shaped element disposed in the hollow portion of said hollow airfoil having a pair of legs extending longitudinally from the bottom portion of said airfoil, a first portion of one of said pair of legs bearing against the inner surface of said wall means defining said pressure side, a second portion of the other of said pair of legs bearing against said wall means defining said suction side, said first portion and said second portion being mounted in sliding relationship with respect to said wall means to dissipate vibratory energy encountered by said hollow airfoil, an apex of said legs is scalloped as to form recesses to permit fluid flow in said airfoil, said elongated U-shaped element being cantilevered mounted and supported on one end to the end of the wall of said airfoil and extending toward to but short of the opposing end of said airfoil and means to bond said one end of said elongated U-shaped element to said wall means.

2. The combination as claimed in claim 1 wherein the upper edges of the legs of the U-shaped element is recessed to define a space for the passage of coolant in said hollow portion.

3. The combination as claimed in claim 2 wherein said upper edges of the legs of the U-shaped element is scalloped to define said space for the passage of coolant in said hollow portion.

4. The combination as claimed in claim 2 including a tang at the end of said elongated element adapted to fit into a hole formed in said wall of said airfoil to support said spring damper.

5. A hollow airfoil for the stator of the compressor of a gas turbine engine including wall means defining a pressure side, a suction side a tip and a root, in combination with a spring damper means comprising an elongated V-shaped element disposed in the hollow portion of said hollow airfoil having a pair of legs extending longitudinally from the bottom portion of said airfoil, a first portion of one of said pair of legs bearing against the inner surface of said wall means defining said pressure side, a second portion of the other of said pair of legs bearing against said wall means defining said suction side, said first portion and said second portion being mounted in sliding relationship with respect to said wall means to dissipate vibratory energy encountered by said hollow airfoil, an apex of said legs is scalloped as to form recesses to permit fluid flow in said airfoil, said elongated V-shaped element being cantilevered mounted and supported on one end to the end of the wall of said airfoil and extending toward to but short of the opposing end of said airfoil and means to bond said one end of said elongated V-shaped element to said wall means.

6. The combination as claimed in claim 5 wherein the upper edges of the legs of the V-shaped element is recessed to define a space for the passage of coolant in said hollow portion.

7. The combination as claimed in claim 6 wherein said upper edges of the legs of the V-shaped element is scalloped to define said space for the passage of coolant in said hollow portion.

8. The combination as claimed in claim 7 including a tang at the end of said elongated element adapted to fit into a hole formed in said wall of said airfoil to support said spring damper.

* * * * *